United States Patent Office 3,755,534
Patented Aug. 28, 1973

3,755,534
CATALYTIC CONTROL OF AUTO EXHAUST EMISSIONS
James R. Graham, Columbia, Md., assignor to
W. R. Grace & Co.
Filed Aug. 12, 1971, Ser. No. 171,152
Int. Cl. B01d 53/34
U.S. Cl. 423—213.7      4 Claims

ABSTRACT OF THE DISCLOSURE

A method of converting the noxious components of auto exhaust gases to innocuous entities by contacting the gases with a palladium catalyst on a suitable support followed by passing the gases over a catalyst active for hydrocarbon conversion on a suitable support. The use of this particular configuration results in improved conversion of the carbon monoxide and hydrocarbons in the exhaust gases.

BACKGROUND OF THE INVENTION

(1) Prior art

Figure 1:
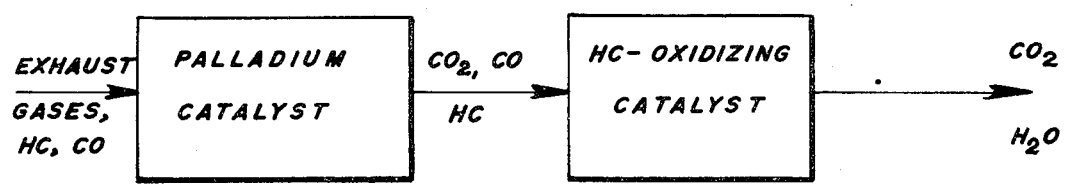

The problem of air pollution is not a new one. However, in recent years the problem has become more and more acute as the number of vehicles has increased. Much of the pollution is a result of organic pollutants which are derived from unburned or partially burned hydrocarbons in the exhaust of internal combustion engines.

The exhaust gases of the internal combustion engine also contain oxides of nitrogen (designed $NO_x$). In the presence of sunlight, photolysis of the oxides of nitrogen leads to the formation of measurable quantities of ozone. The ozone, in turn, reacts with various organic pollutants to form compounds which can cause the many undesirable manifestations of smog, such as eye irritation, visibility reduction, and plant damage.

If there is not a rapid dispersion of pollutants due to meterological conditions, a smog condition results. In addition to the hydrocarbons and nitrogen oxides, another pollutant which is of much concern is carbon monoxide which is undesirable because of its toxic nature. It, too, is derived mainly from exhaust emissions.

Almost since the advent of the automobile attempts have been made to solve the problem by rendering harmless and unobjectionable the noxious fumes which are the byproducts of internal combustion engines. Various devices and filters using elementary catalytic materials, and from the 1920's on, various modifications of filters and mufflers, have been designed in an attempt to solve this problem. Unfortunately, to date none have met with success complete enough for practical application. One of the most difficult problems to overcome is the fact that although a given purification system appears to work initially, within a short period of time it becomes catalytically inactive and consequently useless.

It does not seem feasible to install catalytic systems which must be periodically removed and rejuvenated because of the cost of such a system and such rejuvenation. Another of the problems which several investigators have realized is that the only practical way to treat exhaust fumes to reduce hydrocarbon, carbon monoxide, and nitrogen oxide pollution, is to oxidize the hydrocarbons to carbon dioxide and water and the carbon monoxide to carbon dioxide, and reduce the nitrogen oxides to nitrogen and oxygen. There is therefore the problem of finding a catalytic system which is capable of both oxidizing and reducing.

A wide selection of oxidation catalysts have been produced in the past with respect to chemical composition and physical structure. As to chemical compositions, the ability of a wide variety of metals and metal oxides, either alone or in combination, to catalyze the complete oxidation of hydrocarbons has been noted. The same is true of carbon monoxide emissions.

To be sufficiently effective for the removal of hydrocarbons, carbon monoxide, and nitrogen oxides from auto exhaust gases and to meet the standards of maximum emissions currently under consideration in the legislatures of the various states, a catalyst for treating exhaust gases must become efficient within a very few seconds after engine start-up and must maintain its activity throughout the various modes of engine operation. The problem of excessively high temperatures which are obtained when concentrations of pollutants are being oxidized, or reduced, must also be solved in this system. It is not unusual for catalytic temperatures to reach 1800° F. or higher. A normal catalytic system cannot withstand prolonged exposure to those temperatures without thermal or thermochemical degradation of a catalyst. For example, gamma or eta alumina, which are common and useful supports or carriers, are seriously affected by high temperatures.

The problem of conversion of carbon monoxide, nitrogen oxides, and hydrocarbons at the low temperatures obtained in a catalyst muffler system at the start-up period of engine operation is also particularly troublesome. A catalyst must be active enough initially to be acceptable for use in an auto exhaust catalyst system. It is not sufficient that a catalyst will have good activity after the engine has warmed up and after the catalyst bed is at a temperature sufficiently high to cause exhaust vapors passing through the bed to be oxidized to carbon dioxide and water and reduced to nitrogen.

Catalytic systems which have been devised give satisfactory results for carbon monoxide and hydrocarbon conversion but frequently suffer from relatively poor conversion of nitrogen oxides, and vice-versa. Further, the temperatures at which conversion occurs have not heretofore been sufficiently low to meet Federal Standards. Since the ideal catalytic system gives a good conversion of each of the exhaust gas components at a low temperature, this problem is of prime importance.

Both platinum and palladium have been reported in the literature to be effective catalysts for the removal of carbon monoxide and hydrocarbons from auto exhaust. However, neither is a sufficiently active oxidation catalyst to meet the 1975 Federal Auto Emission Standards, unless present in large concentrations. Platinum has further been reported to be unsatisfactory for the removal of $NO_x$ from auto exhaust emissions even under the most favorable conditions.

Other catalytic components such as compositions of copper, chromium, and manganese oxides and palladium, copper, chromium, and manganese oxides, and the like are well-known in the art to be useful hydrocarbon oxidation catalysts. However, these catalysts are also not sufficiently active to meet the 1975 Federal Auto Emission Standards. Another useful hydrocarbon oxidation catalyst is cobalt oxide promoted with palladium and further optionally containing oxides of nickel, chromium, manganese, and iron. Of course, other hydrocarbon oxidation catalysts are also well-known.

The problem of finding a catalytic system, catalyst, and/or catalyst support which is capable of both oxidizing the carbon monoxide and hydrocarbons and also reducing the nitrogen oxides which are found in automotive exhaust gases and is capable of thermal and chemical stability is therefore very significant to the automotive industry.

As regards the catalyst support, one of the problems is that when a favored support, alumina, is used in the gamma form there is a sufficient surface activity and surface area but, as the temperature increases the gamma (or other transition forms of alumina) undergoes a change to alpha-alumina. This is undesirable due to a loss of surface activity and a resulting lessening of the activity of the catalyst which is contained on the support, thereby affecting the catalyst's effectiveness. Further, a support alumina shrinks in volume as the conversion to alpha-alumina takes place. This problem can be solved by the use of rare earth oxides. That technique is also useful and desirable when alumina is used as the catalyst support in the instant invention.

(2) Objects of the invention

It is therefore an object of this invention to produce a catalyst which is capable of oxidizing carbon monoxide and hydrocarbons and which exhibits good thermal and chemical stability. It is a further object of this invention to reduce pollution from automotive exhaust gases. It is further an object of this invention to prepare an automobile exhaust catalyst which is thermally and chemically stable and can be used in either a monolithic form or the more conventional particulate (balled) form.

It is a further object of this invention to describe a system for removing pollutants from exhaust gases by the use of platinum and palladium in small amounts.

It is a further object of this invention to describe a system for removing pollutants from exhaust gases by the use of palladium and a hydrocarbon oxidation catalyst in proper configuration.

It is a further object of this invention to describe a system using separate monoliths each of which supports a palladium or hydrocarbon oxidation catalyst, e.g. platinum in proper configuration so as to nearly completely remove carbon monoxide and hydrocarbons from auto exhaust. Other objects will become apparent as the description of this invention proceeds.

BRIEF DESCRIPTION OF THE INVENTION

This invention is a system for removing pollutants from the exhaust fumes produced by internal combustion engines, particularly automobiles. Platinum has been found to be an extremely active catalyst for the oxidation of hydrocarbons but only a moderately active catalyst for carbon monoxide oxidation. In fact, at low temperatures the hydrocarbon oxidation ability of platinum is poisoned by the presence of carbon monoxide and the effect on the platinum is more severe with increasing carbon monoxide concentrations. Palladium on the other hand, has good activity toward carbon monoxide and is a relatively poor hydrocarbon oxidation catalyst. However, if the two catalytic components, i.e. palladium and platinum, are used in a particular specific configuration in an automobile exhaust system, effective removal of both of these pollutants can be accomplished. I have found that when the exhaust gases are first passed over a palladium catalyst, e.g. supported on monolith, and then passed over a platinum catalyst, e.g. platinum on a second monolith there is a significant increase in the overall activity for carbon monoxide and hydrocarbons. I have also found that putting platinum and palladium on the same support or a mixture of the two metals on different supports, results in a catalyst with good carbon monoxide activity but poor hydrocarbon activity. If the exhaust gases are initially passed through the platinum catalyst and then through the palladium catalyst the platinum is poisoned and a catalyst of lower activity results. In addition to helping to prevent poisoning by CO of the platinum catalyst, the palladium performs another important role in this catalytic system. Palladium begins catalyzing the oxidation of CO to $CO_2$ at a fairly low temperature, this temperature being reached between 10 and 20 seconds after the cold automobile is started. During this period the palladium catalyst is exposed to high concentration of CO (75% of exhaust volume). The oxidation of this high concentration of CO generates a large amount of heat. This heat raises the temperature of the palladium and platinum catalysts to greater than 1000° F. within 30 seconds after the automobile is started. In brief the heat generated by the palladium catalyst quickly raises the temperature, of the platinum catalyst sufficiently high to overcome CO poisoning and start it catalyzing the oxidation of HC and CO. Thus it is essential for maximum activity that a palladium catalyst precede the platinum catalyst in the exhaust stream. Even though in the reversed configuration the palladium catalyst begins catalyzing the oxidation of CO at a low temperature, the heat generated by this oxidation is lost to the atmosphere and is not therefore used to heat the platinum catalyst. The result is a catalyst that reached reaction temperature more slowly and one that gives higher exhaust emissions. Hence the importance, heretofore not recognized, of placing a palladium catalyst in front of, i.e. in position to initially intercept the exhaust gases, the platinum catalyst.

It is, however, to be realized that although the above description refers to platinum, other HC oxidation catalysts may be used with similar effect, and in some instances may even be preferred due to the expensive cost of platinum. Some of the other useful catalysts are disclosed in U.S. Pat. Nos. 3,288,558; 3,295,918; 3,304,150; 3,322,491; 3,338,666; 3,346,328; 3,455,843; and 3,470,105. These catalytic compositions include the following catalytic components in percentages by weight of the total catalyst structure:

Catalyst A catalytic components—10% CuO, 4.0% $Cr_2O_3$, 0.02% Pd
Catalyst B catalytic components—8% CuO, 12.0% $MnO_2$, 0.02% Pd
Catalyst C catalytic components—4% CuO, 6% $MnO_2$, 4% $Cr_2O_3$, 0.02% Pd
Catalyst D catalytic components—4% CuO, 6% $MnO_2$, 6% $Cr_2O_3$, 0.02% Pd Also operable are cobalt catalysts optionally promoted with palladium and optionally containing one or more of the following oxides: nickel, chromium, manganese, and iron. Of course, several catalytic beds may be employed in series, but unless the emissions are first passed over a palladium catalyst, the HC oxidation, e.g., platinum, catalyst will be poisoned and not perform to its highest capabilities. By the use of this system 0.02–0.50, generally less than 0.2, weight percent of platinum and palladium on suitable supports can be used to provide sufficient activity to meet the 1975 Federal Auto Emissions Standards.

When platinum is supported on an acidic support, e.g. an aluminosilicate, there is a large reduction in nitrogen oxide emissions. That described invention and the one described herein can be utilized together as explained therein. Briefly, the exhaust emissions are passed over a platinum catalyst on an acidic support to reduce the nitrogen oxide emissions. Air is then introduced into the emission stream to provide oxygen for oxidation of the carbon monoxide and oxygen as described in this application.

Of course, methods of impregnating platinum and palladium on supports are well-known and depending upon the type of support, monolith or particulate, impregnation can be by spraying, immersing the support in a solution containing the catalyst, or any other convenient means.

I have therefore found a means of removing carbon monoxide and hydrocarbons, from emissions of internal combustion engines, particularly automobile exhaust emissions by the use of palladium and a hydrocarbon oxidation catalyst, preferably platinum, supported on independent supports in a specific configuration.

Figure 2:
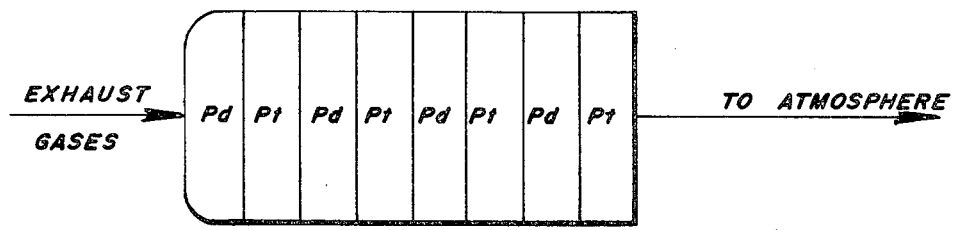

FIG. 1 is a schematic drawing of one embodiment of the invention wherein carbon monoxide and hydrocarbons are oxidized and FIG. 2 is a drawing of another embodiment of the invention wherein carbon monoxide and hydrocarbons are oxidized by using a series of platinum and palladium catalysts. Of course, other hydrocarbon oxidizing catalysts such as those described herein can be substituted for the platinum.

DETAILED DESCRIPTION OF THE INVENTION

This invention is a system for removing pollutants from the exhaust gases of land vehicles. It is to be understood that this invention is useful for all land vehicle but for purposes of this specification and claims "automobiles" is used interchangeably with land vehicles.

As stated heretofore, the pollutants with which this disclosure is concerned are carbon monoxide (CO) and hydrocarbons (HC). It is well known in the art that platinum and palladium are effective catalysts for the removal of carbon monoxide and hydrocarbons from automobile exhaust. However, unless present in large concentrations, i.e. at least 0.3 wt. percent, neither is sufficiently active to meet the 1975 Federal Emission Standards, as set out in the Federal Register, vol. 35, No. 219 (Nov. 10, 1970). Those standards are as follows: 4.0 g./mil $NO_x$, 0.47 g./mile HC, and 4.6 g./mile CO.

I have found that platinum is an extremely active catalyst for the oxidation of hydrocarbons and only a moderately active catalyst for CO oxidation. Further, I have found that the HC oxidation ability of platinum is slightly poisoned by the presence of CO and that platinum decreases in activity with increasing CO concentrations. I have further found that palladium is a relatively poor hydrocarbon oxidation catalyst but a good CO catalyst.

I have further found that CO also poisons other HC oxidation catalysts. I have also found that by placing a palladium catalyst in proper configuration to initially intercept the automobile exhaust gases CO is oxidized and thereby heat is produced which heats the second catalyst bed (HC oxidation) thereby resulting in a more effective removal of HC.

It should be understood that for purposes of this specification and claims that reference to platinum includes other HC oxidation catalysts such as those mentioned heretofore.

Thus, the maximum conversion of both hydrocarbons and carbon monoxide by platinum and palladium is possible only when high levels of carbon monoxide are not allowed to come into contact with the platinum catalyst.

Turning now to FIG. 1, which is a simplified schematic drawing of a particular embodiment of this invention, the automobile emissions containing hydrocarbons (HC) and carbon monoxide (CO) are directed to a palladium catalyst where a large portion of the carbon monoxide is oxidized to carbon dioxide. The hot automobile exhaust (considerable amounts of heat are generated when CO is oxidized over Pd) containing low levels of CO is then directed to the hydrocarbon oxidizing, e.g. platinum, catalyst where the hydrocarbons and the remaining CO are oxidized. This system removes the CO and HC sufficiently to meet the 1975 Standards described heretofore.

FIG. 2 which is another embodiment of the invention shows an embodiment of this invention wherein a series of palladium and platinum catalysts are used to effectively remove CO and HC as required by the 1975 Standards. Of course, other HC oxidizing catalysts can be substituted for the platinum.

The palladium and platinum catalysts can be supported on any type of structure such as a monolith or the more conventional particulate, e.g., balled, pilled, pelleted, etc., forms. A particularly useful method of preparing a monolithic structure is that disclosed in copending U.S. Ser. No. 82,918 filed Oct. 22, 1970 assigned to the same assignee, and incorporated herein by reference. Therein a polyolefin, plasticizer, and filler are admixed, shaped, the plasticizer extracted, the polyolefin burned-off, and the alumina sintered. Some of the useful fillers, or support materials include α-alumina, mullite, spinel, zircon-mullite, cordierite, and the like. Of course, monoliths prepared by any process are useful herein.

As disclosed in copending U.S. Ser. No. 152,388, filed June 11, 1971 assigned to the same assignee, and incorporated herein by reference, the monolith can preferably be coated with a thin layer of gamma alumina to increase the "activity" of the structure. This gamma alumina can be impregnated with a rare earth oxide(s) as described heretofore, or the entire gamma alumina coated monolithic structure can be sprayed with or immersed in a rare earth solution. As disclosed in said copending application, a preferable method of coating the monolith with gamma alumina is to immerse the entire monolith into a homogeneous slurry prepared by mixing alpha trihydrate (average particle size $0.2\mu$) with a ⅔% solution of carboxymethyl cellulose (CMC) in a weight ratio of 1:2. The slurry also contains sufficient rare earth such that the finally obtained gamma alumina contains about 0.1–10% by weight rare earth metal oxide. The CMC has the effect of quickening the drying steps which are to follow. The monolith is dipped into the slurry, excess slurry is shaken off and the monolith is sprayed with an air hose to remove excess slurry within the monolith. The whole is dried at about 150–200° F. for ½ hour, 1 hour at 300° F., and then at least one hour more to convert the trihydrate to gamma alumina at a temperature of about 1050° F. This procedure provides a monolith containing 10–12% by weight stabilized gamma alumina, said gamma alumina impregnated with 0.1–10% by weight, based on the weight of the alumina, rare earth metal oxide.

Whether the monolith is made by the above-described process or more conventional processes, or coated or not coated with gamma alumina, it can then be impregnated with platinum (or palladium) by any convenient method. In one convenient method the monolith is immersed in a solution of $Pd(NO_3)_2$ sufficient to deposit 0.02–0.5 weight percent Pd within the pores of the monolith, followed by sulfiding, reduction with hydrazine, washing, drying and calcining at 1400° F. Of course, the palladium can be sprayed onto the monolith. The second monolith can be impregnated with platinum by any known means, but it is preferred to impregnate the monolith with chloroplatinic acid, followed by sulfiding, extensive washing, drying and calcining at 1400° F.

Either monolith can be immersed in the impregnating solution, sprayed with the impregnating solution, etc. The impregnation should result in a support containing 0.02–0.5 weight percent platinum or palladium. Preferably the support will contain about 0.15% by weight platinum (or palladium).

Of course, besides a monolith the more conventional particulate support materials can be used. These supports include mullite, spinel, zircon-mullite, α-alumina, codierite, and the like. The methods of impregnation may vary, but the percentages of platinum and palladium will remain the same.

It is also possible to use a monolith to support one catalytic component, i.e. platinum or palladium and the particulate form to support the other. It is to be understood that use of the term "particulate forms" refers to balled, pilled, pelleted, and the like all of which are well-known to those skilled in the art. Again, it is essential that the palladium oxidize most of the carbon monoxide in the exhaust gases before the exhaust gas stream reaches the platinum catalyst.

The platinum and palladium catalysts can be in the form of monoliths or particulate form. Both catalyst beds can be monoliths or either one can be a monolith and the other in the particulate form. In each catalyst the catalytic component, i.e. platinum or palladium, is 0.02–0.5 weight percent of the total catalyst (preferably 0.15% by weight).

This invention then is that only by the use of two distinct catalyst beds, the first of which is palladium and the second being a hydrocarbon oxidizing catalyst, e.g. platinum, can the pollutants, i.e. hydrocarbons and carbon monoxide be oxidized efficiently. To effect this result a palladium catalyst is used to remove most of the carbon monoxide to preventing poisoning of the hydrocarbon oxidizing catalyst when hydrocarbons are then oxidized. The palladium catalyst also generates large amounts of heat by catalyzing the oxidation of CO which quickly raises the temperature of the HC oxidizing catalyst to the point where it is active.

When a monolith is used its size is dependent on the need. However, a typical size is 1½" x 4" diameter which it has been found is successful in removing the pollutants described heretofore.

The following examples, while in no way intended to be limiting, will aid in the understanding of this invention.

EXAMPLE 1

Two monoliths commercially available from Corning Glass Co. and measuring 1½" x 4" diameter were coated with gamma alumina by dipping the monolith into a slurry prepared by admixing 250 grams of fine size alumina (Hydral 705 commercially available from Alcoa Aluminum, line) and 510 g. of a ⅔ weight percent solution of carboxymethyl cellulose (CMC) in water (to decrease the drying time).

The monoliths were then removed from the slurry, shaken to remove excess slurry, and sprayed with an air hose to remove excess slurry within the structures. The coated monoliths were then dried for ½ hour at 150–200° F., 1 hour at about 300° F., and then 4 hours at 1000° F. to calcine the alumina. The monoliths each contained about 14% by weight alumina coating. One monolith was impregnated with 0.15 wt. percent palladium by immersing the monolith in a solution of 7.5 grams $Pd(NO_3)_2$ in 300 mls. water. The monolith picked up 30 grams of the solution, then sulfided, reduced with hydrazine, washed with water, dried, and calcined at 1400° F.

The second coated monolith was impregnated with 0.15% by weight platinum by immersing the monolith in a 300 ml. solution of chloroplatinic acid (containing 3 grams Pt). The monolith picked up 15 grams of solution (0.15 g. Pt), was sulfided, washed in water for 16 hours, dried, and calcined at 1400° F.

The two monoliths were then placed in series (total volume=38 in.³) with the palladium catalyst in position to initially intercept the exhaust gases and placed in a muffler on a 1971 Chevelle which was run according to the 1972 Cold Start Procedure Federal Test Cycle, i.e. a specified procedure for testing pollutants in automobile exhausts as described in the Federal Register, vol. 35, No. 219 (Nov. 10, 1970). In said test the engine of a test vehicle is run at a specified pattern as shown in its entirety in Table 1. This cycle gave the following results for carbon monoxide and hydrocarbons:

|    | Required for 1975, g./mile | Actual, g./mile |
|---|---|---|
| CO | 4.6 | 3.2 |
| HC | .47 | 0.23 |

TABLE 1
DHEW URBAN DYNAMOMETER DRIVING SCHEDULE
[Speed versus time sequence]

| Time (sec.) | Speed (m.p.h.) | Time (sec.) | Speed (m.p.h.) | Time (sec.) | Speed (m.p.h.) |
|---|---|---|---|---|---|
| 0 | 0.0 | 102 | 30.9 | 204 | 46.8 |
| 1 | 0.0 | 103 | 31.0 | 205 | 47.5 |
| 2 | 0.0 | 104 | 30.9 | 206 | 47.5 |
| 3 | 0.0 | 105 | 30.4 | 207 | 47.3 |
| 4 | 0.0 | 106 | 29.8 | 208 | 47.2 |
| 5 | 0.0 | 107 | 29.9 | 209 | 47.0 |
| 6 | 0.0 | 108 | 30.2 | 210 | 47.0 |
| 7 | 0.0 | 109 | 30.7 | 211 | 47.0 |
| 8 | 0.0 | 110 | 31.2 | 212 | 47.0 |
| 9 | 0.0 | 111 | 31.8 | 213 | 47.0 |
| 10 | 0.0 | 112 | 32.2 | 214 | 47.2 |
| 11 | 0.0 | 113 | 32.4 | 215 | 47.4 |
| 12 | 0.0 | 114 | 32.2 | 216 | 47.9 |
| 13 | 0.0 | 115 | 31.7 | 217 | 48.5 |
| 14 | 0.0 | 116 | 28.6 | 218 | 49.1 |
| 15 | 0.0 | 117 | 25.3 | 219 | 49.5 |
| 16 | 0.0 | 118 | 22.0 | 220 | 50.0 |
| 17 | 0.0 | 119 | 18.7 | 221 | 50.6 |
| 18 | 0.0 | 120 | 15.4 | 222 | 51.0 |
| 19 | 0.0 | 121 | 12.1 | 223 | 51.5 |
| 20 | 0.0 | 122 | 8.8 | 224 | 52.2 |
| 21 | 3.0 | 123 | 5.5 | 225 | 53.2 |
| 22 | 5.9 | 124 | 2.2 | 226 | 54.1 |
| 23 | 8.6 | 125 | 0.0 | 227 | 54.6 |
| 24 | 11.5 | 126 | 0.0 | 228 | 54.9 |
| 25 | 14.3 | 127 | 0.0 | 229 | 55.0 |
| 26 | 16.9 | 128 | 0.0 | 230 | 54.9 |
| 27 | 17.3 | 129 | 0.0 | 231 | 54.6 |
| 28 | 18.1 | 130 | 0.0 | 232 | 54.6 |
| 29 | 20.7 | 131 | 0.0 | 233 | 54.8 |
| 30 | 21.7 | 132 | 0.0 | 234 | 55.1 |
| 31 | 22.4 | 133 | 0.0 | 235 | 55.5 |
| 32 | 22.5 | 134 | 0.0 | 236 | 55.7 |
| 33 | 22.1 | 135 | 0.0 | 237 | 56.1 |
| 34 | 21.5 | 136 | 0.0 | 238 | 56.3 |
| 35 | 20.9 | 137 | 0.0 | 239 | 56.6 |
| 36 | 20.4 | 138 | 0.0 | 240 | 56.7 |
| 37 | 19.8 | 139 | 0.0 | 241 | 56.7 |
| 38 | 17.0 | 140 | 0.0 | 242 | 56.5 |
| 39 | 14.9 | 141 | 0.0 | 243 | 56.5 |
| 40 | 14.9 | 142 | 0.0 | 244 | 56.5 |
| 41 | 15.2 | 143 | 0.0 | 245 | 56.5 |
| 42 | 15.5 | 144 | 0.0 | 246 | 56.5 |
| 43 | 16.0 | 145 | 0.0 | 247 | 56.5 |
| 44 | 17.1 | 146 | 0.0 | 248 | 56.4 |
| 45 | 19.1 | 147 | 0.0 | 249 | 56.1 |
| 46 | 21.1 | 148 | 0.0 | 250 | 55.8 |
| 47 | 22.7 | 149 | 0.0 | 251 | 55.1 |
| 48 | 22.9 | 150 | 0.0 | 252 | 54.6 |
| 49 | 22.7 | 151 | 0.0 | 253 | 54.2 |
| 50 | 22.6 | 152 | 0.0 | 254 | 54.0 |
| 51 | 21.3 | 153 | 0.0 | 255 | 53.7 |
| 52 | 19.0 | 154 | 0.0 | 256 | 53.6 |
| 53 | 17.1 | 155 | 0.0 | 257 | 53.9 |
| 54 | 15.8 | 156 | 0.0 | 258 | 54.0 |
| 55 | 15.8 | 157 | 0.0 | 259 | 54.1 |
| 56 | 17.7 | 158 | 0.0 | 260 | 54.1 |
| 57 | 19.8 | 159 | 0.0 | 261 | 53.8 |
| 58 | 21.6 | 160 | 0.0 | 262 | 53.4 |
| 59 | 23.2 | 161 | 0.0 | 263 | 53.0 |
| 60 | 24.2 | 162 | 0.0 | 264 | 52.6 |
| 61 | 24.6 | 163 | 0.0 | 265 | 52.1 |
| 62 | 24.9 | 164 | 3.3 | 266 | 52.4 |
| 63 | 25.0 | 165 | 6.6 | 267 | 52.0 |
| 64 | 24.6 | 166 | 9.9 | 268 | 51.9 |
| 65 | 24.5 | 167 | 13.2 | 269 | 51.7 |
| 66 | 24.7 | 168 | 16.5 | 270 | 51.5 |
| 67 | 24.8 | 169 | 19.8 | 271 | 51.6 |
| 68 | 24.7 | 170 | 22.2 | 272 | 51.8 |
| 69 | 24.6 | 171 | 24.3 | 273 | 52.1 |
| 70 | 24.6 | 172 | 25.8 | 274 | 52.5 |
| 71 | 25.1 | 173 | 26.4 | 275 | 53.0 |
| 72 | 25.6 | 174 | 25.7 | 276 | 53.5 |
| 73 | 25.7 | 175 | 25.1 | 277 | 54.0 |
| 74 | 25.4 | 176 | 24.7 | 278 | 54.9 |
| 75 | 24.9 | 177 | 25.0 | 279 | 55.4 |
| 76 | 25.0 | 178 | 25.2 | 280 | 55.6 |
| 77 | 25.4 | 179 | 25.4 | 281 | 56.0 |
| 78 | 26.0 | 180 | 25.8 | 282 | 56.0 |
| 79 | 26.0 | 181 | 27.2 | 283 | 55.8 |
| 80 | 25.7 | 182 | 26.5 | 284 | 55.2 |
| 81 | 26.1 | 183 | 24.0 | 285 | 54.5 |
| 82 | 26.7 | 184 | 22.7 | 286 | 53.6 |
| 83 | 27.5 | 185 | 19.4 | 287 | 52.5 |
| 84 | 28.6 | 186 | 17.7 | 288 | 51.5 |
| 85 | 29.3 | 187 | 17.2 | 289 | 51.5 |
| 86 | 29.8 | 188 | 18.1 | 290 | 51.5 |
| 87 | 30.1 | 189 | 18.6 | 291 | 51.1 |
| 88 | 30.4 | 190 | 20.0 | 292 | 50.1 |
| 89 | 30.7 | 191 | 22.2 | 293 | 50.0 |
| 90 | 30.7 | 192 | 24.5 | 294 | 50.1 |
| 91 | 30.5 | 193 | 27.3 | 295 | 50.0 |
| 92 | 30.4 | 194 | 30.5 | 296 | 49.6 |
| 93 | 30.3 | 195 | 33.5 | 297 | 49.5 |
| 94 | 30.4 | 196 | 36.2 | 298 | 49.5 |
| 95 | 30.8 | 197 | 37.3 | 299 | 49.5 |
| 96 | 30.4 | 198 | 39.3 | 300 | 49.1 |
| 97 | 29.9 | 199 | 40.5 | 301 | 48.6 |
| 98 | 29.5 | 200 | 42.1 | 302 | 48.1 |
| 99 | 29.8 | 201 | 43.5 | 303 | 47.2 |
| 100 | 30.3 | 202 | 45.1 | 304 | 46.1 |
| 101 | 30.7 | 203 | 46.0 | | |

TABLE 1—Continued

| Time (sec.) | Speed (m.p.h.) | Time (sec.) | Speed (m.p.h.) | Time (sec.) | Speed (m.p.h.) | Time (sec.) | Speed (m.p.h.) | Time (sec.) | Speed (m.p.h.) | Time (sec.) | Speed (m.p.h.) |
|---|---|---|---|---|---|---|---|---|---|---|---|
| 305 | 45.0 | 408 | 19.1 | 511 | 1.7 | 614 | 19.5 | 717 | 21.6 | 820 | 31.6 |
| 306 | 43.8 | 409 | 22.4 | 512 | 3.5 | 615 | 16.2 | 718 | 20.5 | 821 | 31.5 |
| 307 | 42.6 | 410 | 25.0 | 513 | 5.5 | 616 | 12.9 | 719 | 18.0 | 822 | 30.6 |
| 308 | 41.5 | 411 | 25.6 | 514 | 6.5 | 617 | 9.6 | 720 | 15.0 | 823 | 30.0 |
| 309 | 40.3 | 412 | 27.5 | 515 | 8.5 | 618 | 6.3 | 721 | 12.0 | 824 | 29.9 |
| 310 | 38.5 | 413 | 29.0 | 516 | 9.6 | 619 | 3.0 | 722 | 9.0 | 825 | 29.9 |
| 311 | 37.0 | 414 | 30.0 | 517 | 10.5 | 620 | 0.0 | 723 | 6.2 | 826 | 29.9 |
| 312 | 35.2 | 415 | 30.1 | 518 | 11.9 | 621 | 0.0 | 724 | 4.5 | 827 | 29.9 |
| 313 | 33.8 | 416 | 30.0 | 519 | 14.0 | 622 | 0.0 | 725 | 3.0 | 828 | 29.6 |
| 314 | 32.5 | 417 | 29.7 | 520 | 16.0 | 623 | 0.0 | 726 | 2.1 | 829 | 29.5 |
| 315 | 31.5 | 418 | 29.3 | 521 | 17.7 | 624 | 0.0 | 727 | 0.5 | 830 | 29.5 |
| 316 | 30.6 | 419 | 28.8 | 522 | 19.0 | 625 | 0.0 | 728 | 0.5 | 831 | 29.3 |
| 317 | 30.5 | 420 | 28.0 | 523 | 20.1 | 626 | 0.0 | 729 | 3.2 | 832 | 28.9 |
| 318 | 30.0 | 421 | 25.0 | 524 | 21.0 | 627 | 0.0 | 730 | 6.5 | 833 | 28.2 |
| 319 | 29.0 | 422 | 21.7 | 525 | 22.0 | 628 | 0.0 | 731 | 9.6 | 834 | 27.7 |
| 320 | 27.5 | 423 | 18.4 | 526 | 23.0 | 629 | 0.0 | 732 | 12.5 | 835 | 27.0 |
| 321 | 24.8 | 424 | 15.1 | 527 | 23.8 | 630 | 0.0 | 733 | 14.0 | 836 | 25.5 |
| 322 | 21.5 | 425 | 11.8 | 528 | 24.5 | 631 | 0.0 | 734 | 16.0 | 837 | 23.7 |
| 323 | 20.1 | 426 | 8.5 | 529 | 24.9 | 632 | 0.0 | 735 | 18.0 | 838 | 22.0 |
| 324 | 19.1 | 427 | 5.2 | 530 | 25.0 | 633 | 0.0 | 736 | 19.6 | 839 | 20.5 |
| 325 | 18.5 | 428 | 1.9 | 531 | 25.0 | 634 | 0.0 | 737 | 21.5 | 840 | 19.2 |
| 326 | 17.0 | 429 | 0.0 | 532 | 25.0 | 635 | 0.0 | 738 | 23.1 | 841 | 19.2 |
| 327 | 15.5 | 430 | 0.0 | 533 | 25.0 | 636 | 0.0 | 739 | 24.5 | 843 | 20.9 |
| 328 | 12.5 | 431 | 0.0 | 534 | 25.0 | 637 | 0.0 | 740 | 25.5 | 844 | 21.4 |
| 329 | 10.8 | 432 | 0.0 | 535 | 25.0 | 638 | 0.0 | 741 | 26.5 | 845 | 22.0 |
| 330 | 8.0 | 433 | 0.0 | 536 | 25.6 | 639 | 0.0 | 742 | 27.1 | 846 | 22.6 |
| 331 | 4.7 | 434 | 0.0 | 537 | 25.8 | 640 | 0.0 | 743 | 27.6 | 847 | 23.2 |
| 332 | 1.4 | 435 | 0.0 | 538 | 26.0 | 641 | 0.0 | 744 | 27.9 | 848 | 24.0 |
| 333 | 0.0 | 436 | 0.0 | 539 | 25.6 | 642 | 0.0 | 745 | 28.3 | 849 | 25.0 |
| 334 | 0.0 | 437 | 0.0 | 540 | 25.2 | 643 | 0.0 | 746 | 28.6 | 850 | 26.0 |
| 335 | 0.0 | 438 | 0.0 | 541 | 25.0 | 644 | 0.0 | 747 | 28.6 | 851 | 26.6 |
| 336 | 0.0 | 439 | 0.0 | 542 | 25.0 | 645 | 0.0 | 748 | 28.3 | 852 | 26.6 |
| 337 | 0.0 | 440 | 0.0 | 543 | 25.0 | 646 | 2.0 | 749 | 28.2 | 853 | 26.8 |
| 338 | 0.0 | 441 | 0.0 | 544 | 24.4 | 647 | 4.5 | 750 | 28.0 | 854 | 27.0 |
| 339 | 0.0 | 442 | 0.0 | 545 | 23.1 | 648 | 7.8 | 751 | 27.5 | 855 | 27.2 |
| 340 | 0.0 | 443 | 0.0 | 546 | 19.8 | 649 | 10.2 | 752 | 26.8 | 856 | 27.8 |
| 341 | 0.0 | 444 | 0.0 | 547 | 16.5 | 650 | 12.5 | 753 | 25.5 | 857 | 28.1 |
| 342 | 0.0 | 445 | 0.0 | 548 | 13.2 | 651 | 14.0 | 754 | 23.5 | 858 | 28.8 |
| 343 | 0.0 | 446 | 0.0 | 549 | 9.9 | 652 | 15.3 | 755 | 21.5 | 859 | 28.9 |
| 344 | 0.0 | 447 | 0.0 | 550 | 6.6 | 653 | 17.5 | 756 | 19.0 | 860 | 29.0 |
| 345 | 0.0 | 448 | 3.3 | 551 | 3.3 | 654 | 19.6 | 757 | 16.5 | 861 | 29.1 |
| 346 | 0.0 | 449 | 6.6 | 552 | 0.0 | 655 | 21.0 | 758 | 14.9 | 862 | 29.0 |
| 347 | 1.0 | 450 | 9.9 | 553 | 0.0 | 656 | 22.2 | 759 | 12.5 | 863 | 28.1 |
| 348 | 4.3 | 451 | 13.2 | 554 | 0.0 | 657 | 23.3 | 760 | 9.4 | 864 | 27.5 |
| 349 | 7.6 | 452 | 16.5 | 555 | 0.0 | 658 | 24.5 | 761 | 6.2 | 865 | 27.0 |
| 350 | 10.9 | 453 | 19.8 | 556 | 0.0 | 659 | 25.3 | 762 | 3.0 | 866 | 25.8 |
| 351 | 14.2 | 454 | 23.1 | 557 | 0.0 | 660 | 25.6 | 763 | 1.5 | 867 | 25.0 |
| 352 | 17.3 | 455 | 26.4 | 558 | 0.0 | 661 | 26.0 | 764 | 1.5 | 868 | 24.5 |
| 353 | 20.0 | 456 | 27.8 | 559 | 0.0 | 662 | 26.1 | 765 | 0.5 | 869 | 24.8 |
| 354 | 22.5 | 457 | 29.1 | 560 | 0.0 | 663 | 26.2 | 766 | 0.0 | 870 | 25.1 |
| 355 | 23.7 | 458 | 31.5 | 561 | 0.0 | 664 | 26.2 | 767 | 3.0 | 871 | 25.5 |
| 356 | 25.2 | 459 | 33.0 | 562 | 0.0 | 665 | 26.4 | 768 | 6.3 | 872 | 25.7 |
| 357 | 26.6 | 460 | 33.6 | 563 | 0.0 | 666 | 26.5 | 769 | 9.6 | 873 | 26.2 |
| 358 | 28.1 | 461 | 34.8 | 564 | 0.0 | 667 | 26.5 | 770 | 12.9 | 874 | 26.9 |
| 359 | 30.0 | 462 | 35.1 | 565 | 0.0 | 668 | 26.0 | 771 | 15.8 | 875 | 27.5 |
| 360 | 30.8 | 463 | 35.6 | 566 | 0.0 | 669 | 25.5 | 772 | 17.5 | 876 | 27.8 |
| 361 | 31.6 | 464 | 36.1 | 567 | 0.0 | 670 | 23.6 | 773 | 18.4 | 877 | 28.4 |
| 362 | 32.1 | 465 | 36.0 | 568 | 0.0 | 671 | 21.4 | 774 | 19.5 | 878 | 29.0 |
| 363 | 32.8 | 466 | 36.1 | 569 | 3.3 | 672 | 18.5 | 775 | 20.7 | 879 | 29.2 |
| 364 | 33.6 | 467 | 36.2 | 570 | 6.6 | 673 | 16.4 | 776 | 22.0 | 880 | 29.1 |
| 365 | 34.5 | 468 | 36.0 | 571 | 9.9 | 674 | 14.5 | 777 | 23.2 | 881 | 29.0 |
| 366 | 34.6 | 469 | 35.7 | 572 | 13.0 | 675 | 11.6 | 778 | 25.0 | 882 | 28.9 |
| 367 | 34.9 | 470 | 36.0 | 573 | 14.6 | 676 | 8.7 | 779 | 26.5 | 883 | 28.5 |
| 368 | 34.8 | 471 | 36.0 | 574 | 16.0 | 677 | 5.8 | 780 | 27.5 | 884 | 28.1 |
| 369 | 34.5 | 472 | 35.6 | 575 | 17.0 | 678 | 3.5 | 781 | 28.0 | 885 | 28.0 |
| 370 | 34.7 | 473 | 35.5 | 576 | 17.0 | 679 | 2.0 | 782 | 28.3 | 886 | 28.0 |
| 371 | 35.5 | 474 | 35.4 | 577 | 17.0 | 680 | 0.0 | 783 | 28.9 | 887 | 27.6 |
| 372 | 36.0 | 475 | 35.2 | 578 | 17.5 | 681 | 0.0 | 784 | 28.9 | 888 | 27.2 |
| 373 | 36.0 | 476 | 35.2 | 579 | 17.7 | 682 | 0.0 | 785 | 28.9 | 889 | 26.6 |
| 374 | 36.0 | 477 | 35.2 | 580 | 17.7 | 683 | 0.0 | 786 | 28.8 | 890 | 27.0 |
| 375 | 36.0 | 478 | 35.2 | 581 | 17.5 | 684 | 0.0 | 787 | 28.5 | 891 | 27.5 |
| 376 | 36.0 | 479 | 35.2 | 582 | 17.0 | 685 | 0.0 | 788 | 28.3 | 892 | 27.8 |
| 377 | 36.0 | 480 | 35.2 | 583 | 16.9 | 686 | 0.0 | 789 | 28.3 | 893 | 28.0 |
| 378 | 36.1 | 481 | 35.0 | 584 | 16.6 | 687 | 0.0 | 790 | 28.3 | 894 | 27.8 |
| 379 | 36.4 | 482 | 35.1 | 585 | 17.0 | 688 | 0.0 | 791 | 23.2 | 895 | 28.0 |
| 380 | 36.5 | 483 | 35.2 | 586 | 17.1 | 689 | 0.0 | 792 | 27.6 | 896 | 28.0 |
| 381 | 36.4 | 484 | 35.5 | 587 | 17.0 | 690 | 0.0 | 793 | 27.5 | 897 | 28.0 |
| 382 | 36.0 | 485 | 35.2 | 588 | 16.6 | 691 | 0.0 | 794 | 27.5 | 898 | 27.7 |
| 383 | 35.1 | 486 | 35.0 | 589 | 16.5 | 692 | 0.0 | 795 | 27.5 | 899 | 27.5 |
| 384 | 34.1 | 487 | 35.0 | 590 | 16.5 | 693 | 0.0 | 796 | 27.5 | 900 | 26.9 |
| 385 | 33.5 | 488 | 35.0 | 591 | 16.6 | 694 | 1.4 | 797 | 27.5 | 901 | 26.6 |
| 386 | 31.4 | 489 | 34.8 | 592 | 17.0 | 695 | 3.3 | 798 | 27.5 | 902 | 26.5 |
| 387 | 29.0 | 490 | 34.6 | 593 | 17.6 | 696 | 4.4 | 799 | 27.6 | 903 | 26.5 |
| 388 | 25.7 | 491 | 34.5 | 594 | 18.5 | 697 | 6.5 | 800 | 28.0 | 904 | 26.5 |
| 389 | 23.0 | 492 | 33.5 | 595 | 19.2 | 698 | 9.2 | 801 | 28.5 | 905 | 26.3 |
| 390 | 20.3 | 493 | 32.0 | 596 | 20.2 | 699 | 11.3 | 802 | 30.0 | 906 | 26.2 |
| 391 | 17.5 | 494 | 30.1 | 597 | 21.0 | 700 | 13.5 | 803 | 31.0 | 907 | 26.2 |
| 392 | 14.5 | 495 | 28.0 | 598 | 21.1 | 701 | 14.6 | 804 | 32.0 | 908 | 25.9 |
| 393 | 12.0 | 496 | 25.5 | 599 | 21.2 | 702 | 16.4 | 805 | 33.0 | 909 | 25.6 |
| 394 | 8.7 | 497 | 22.5 | 600 | 21.6 | 703 | 16.7 | 806 | 33.0 | 910 | 25.6 |
| 395 | 5.4 | 498 | 19.8 | 601 | 22.0 | 704 | 16.5 | 807 | 33.6 | 911 | 25.9 |
| 396 | 2.1 | 499 | 16.5 | 602 | 22.4 | 705 | 16.5 | 808 | 34.0 | 912 | 25.8 |
| 397 | 0.0 | 500 | 13.2 | 603 | 22.5 | 706 | 18.2 | 809 | 34.3 | 913 | 25.5 |
| 398 | 0.0 | 501 | 10.3 | 604 | 22.5 | 707 | 19.2 | 810 | 34.2 | 914 | 24.6 |
| 399 | 0.0 | 502 | 7.2 | 605 | 22.5 | 708 | 20.1 | 811 | 34.0 | 915 | 23.5 |
| 400 | 0.0 | 503 | 4.0 | 606 | 22.7 | 709 | 21.5 | 812 | 34.0 | 916 | 22.2 |
| 401 | 0.0 | 504 | 1.0 | 607 | 23.7 | 710 | 22.5 | 813 | 33.9 | 917 | 21.6 |
| 402 | 0.0 | 505 | 0.0 | 608 | 25.1 | 711 | 22.5 | 814 | 33.6 | 918 | 21.6 |
| 403 | 2.6 | 506 | 0.0 | 609 | 26.0 | 712 | 22.1 | 815 | 33.1 | 919 | 21.7 |
| 404 | 5.9 | 507 | 0.0 | 610 | 26.5 | 713 | 22.7 | 816 | 33.0 | 920 | 22.6 |
| 405 | 9.2 | 508 | 0.0 | 611 | 27.0 | 714 | 23.3 | 817 | 32.5 | 921 | 23.4 |
| 405 | 12.5 | 509 | 0.0 | 612 | 26.1 | 715 | 23.5 | 818 | 32.0 | 922 | 24.0 |
| 407 | 15.8 | 510 | 0.0 | 613 | 22.3 | 716 | 22.5 | 819 | 31.9 | 923 | 24.2 |

TABLE 1—Continued

| Time (sec.) | Speed (m.p.h.) | Time (sec.) | Speed (m.p.h.) | Time (sec.) | Speed (m.p.h.) | Time (sec.) | Speed (m.p.h.) | Time (sec.) | Speed (m.p.h.) | Time (sec.) | Speed (m.p.h.) |
|---|---|---|---|---|---|---|---|---|---|---|---|
| 924 | 24.4 | 1,027 | 0.0 | 1,129 | 26.4 | 1,231 | 19.6 | 1,278 | 24.1 | 1,325 | 0.0 |
| 925 | 24.9 | 1,028 | 0.0 | 1,130 | 26.6 | 1,232 | 19.8 | 1,279 | 24.6 | 1,326 | 0.0 |
| 926 | 25.1 | 1,029 | 0.0 | 1,131 | 26.9 | 1,233 | 20.0 | 1,280 | 24.5 | 1,327 | 0.0 |
| 927 | 25.2 | 1,030 | 0.0 | 1,132 | 27.0 | 1,234 | 19.5 | 1,281 | 24.0 | 1,328 | 0.0 |
| 928 | 25.3 | 1,031 | 0.0 | 1,133 | 27.0 | 1,235 | 17.5 | 1,282 | 23.5 | 1,329 | 0.0 |
| 929 | 25.5 | 1,032 | 0.0 | 1,134 | 27.0 | 1,236 | 15.5 | 1,283 | 23.5 | 1,330 | 0.0 |
| 930 | 25.2 | 1,033 | 0.0 | 1,135 | 26.9 | 1,237 | 13.0 | 1,284 | 23.5 | 1,331 | 0.0 |
| 931 | 25.0 | 1,034 | 0.0 | 1,136 | 26.8 | 1,238 | 10.0 | 1,285 | 23.5 | 1,332 | 0.0 |
| 932 | 25.0 | 1,035 | 0.0 | 1,137 | 26.8 | 1,239 | 8.0 | 1,286 | 23.5 | 1,333 | 0.0 |
| 933 | 25.0 | 1,036 | 0.0 | 1,138 | 26.5 | 1,240 | 6.0 | 1,287 | 23.5 | 1,334 | 0.0 |
| 934 | 24.7 | 1,037 | 0.0 | 1,139 | 26.4 | 1,241 | 4.0 | 1,288 | 24.0 | 1,335 | 0.0 |
| 935 | 24.5 | 1,038 | 0.0 | 1,140 | 26.0 | 1,242 | 2.5 | 1,289 | 24.1 | 1,336 | 0.0 |
| 936 | 24.3 | 1,039 | 0.0 | 1,141 | 25.5 | 1,243 | 0.7 | 1,290 | 24.5 | 1,337 | 0.0 |
| 937 | 24.3 | 1,040 | 0.0 | 1,142 | 24.6 | 1,244 | 0.0 | 1,291 | 24.7 | 1,338 | 1.5 |
| 938 | 24.5 | 1,041 | 0.0 | 1,143 | 23.5 | 1,245 | 0.0 | 1,292 | 25.0 | 1,339 | 4.8 |
| 939 | 25.0 | 1,042 | 0.0 | 1,144 | 21.5 | 1,246 | 0.0 | 1,293 | 25.4 | 1,340 | 8.1 |
| 940 | 25.0 | 1,043 | 0.0 | 1,145 | 20.0 | 1,247 | 0.0 | 1,294 | 25.6 | 1,341 | 11.4 |
| 941 | 24.6 | 1,044 | 0.0 | 1,146 | 17.5 | 1,248 | 0.0 | 1,295 | 25.7 | 1,342 | 13.2 |
| 942 | 24.6 | 1,045 | 0.0 | 1,147 | 16.0 | 1,249 | 0.0 | 1,296 | 26.0 | 1,343 | 15.1 |
| 943 | 24.1 | 1,046 | 0.0 | 1,148 | 14.0 | 1,250 | 0.0 | 1,297 | 26.2 | 1,344 | 16.8 |
| 944 | 24.5 | 1,047 | 0.0 | 1,149 | 10.7 | 1,251 | 0.0 | 1,298 | 27.0 | 1,345 | 18.3 |
| 945 | 25.1 | 1,048 | 0.0 | 1,150 | 7.4 | 1,252 | 1.0 | 1,299 | 27.8 | 1,346 | 19.5 |
| 946 | 25.6 | 1,049 | 0.0 | 1,151 | 4.1 | 1,253 | 1.0 | 1,300 | 28.3 | 1,347 | 20.3 |
| 947 | 25.1 | 1,050 | 0.0 | 1,152 | 0.8 | 1,254 | 1.0 | 1,301 | 29.0 | 1,348 | 21.3 |
| 948 | 24.0 | 1,051 | 0.0 | 1,153 | 0.0 | 1,255 | 1.0 | 1,302 | 29.1 | 1,349 | 21.9 |
| 949 | 22.0 | 1,052 | 0.0 | 1,154 | 0.0 | 1,256 | 1.0 | 1,303 | 29.0 | 1,350 | 22.1 |
| 950 | 20.1 | 1,053 | 1.2 | 1,155 | 0.0 | 1,257 | 1.6 | 1,304 | 28.0 | 1,351 | 22.4 |
| 951 | 16.9 | 1,054 | 4.0 | 1,156 | 0.0 | 1,258 | 3.0 | 1,305 | 24.7 | 1,352 | 22.0 |
| 952 | 13.6 | 1,055 | 7.3 | 1,157 | 0.0 | 1,259 | 4.0 | 1,306 | 21.4 | 1,353 | 21.6 |
| 953 | 10.3 | 1,056 | 10.6 | 1,158 | 0.0 | 1,260 | 5.0 | 1,307 | 18.1 | 1,354 | 21.1 |
| 954 | 7.0 | 1,057 | 13.9 | 1,159 | 0.0 | 1,261 | 6.3 | 1,308 | 14.8 | 1,355 | 20.5 |
| 955 | 3.7 | 1,058 | 17.0 | 1,160 | 0.0 | 1,262 | 8.0 | 1,309 | 11.5 | 1,356 | 20.0 |
| 956 | 0.4 | 1,059 | 18.5 | 1,161 | 0.0 | 1,263 | 10.0 | 1,310 | 8.2 | 1,357 | 19.6 |
| 957 | 0.0 | 1,060 | 20.0 | 1,162 | 0.0 | 1,264 | 10.5 | 1,311 | 4.9 | 1,358 | 18.5 |
| 958 | 0.0 | 1,061 | 21.8 | 1,163 | 0.0 | 1,265 | 9.5 | 1,312 | 1.6 | 1,359 | 17.5 |
| 959 | 0.0 | 1,062 | 23.0 | 1,164 | 0.0 | 1,266 | 8.5 | 1,313 | 0.0 | 1,360 | 16.5 |
| 960 | 2.0 | 1,063 | 24.0 | 1,165 | 0.0 | 1,267 | 7.6 | 1,314 | 0.0 | 1,361 | 15.5 |
| 961 | 5.3 | 1,064 | 24.8 | 1,166 | 0.0 | 1,268 | 8.8 | 1,315 | 0.0 | 1,362 | 14.0 |
| 962 | 8.6 | 1,065 | 25.6 | 1,167 | 0.0 | 1,269 | 11.0 | 1,316 | 0.0 | 1,363 | 11.0 |
| 963 | 11.9 | 1,066 | 26.5 | 1,168 | 0.0 | 1,270 | 14.0 | 1,317 | 0.0 | 1,364 | 8.0 |
| 964 | 15.2 | 1,067 | 26.8 | 1,169 | 2.1 | 1,271 | 17.0 | 1,318 | 0.0 | 1,365 | 5.2 |
| 965 | 17.5 | 1,068 | 27.4 | 1,170 | 5.4 | 1,272 | 19.5 | 1,319 | 0.0 | 1,366 | 2.5 |
| 966 | 18.6 | 1,069 | 27.9 | 1,171 | 8.7 | 1,273 | 21.0 | 1,320 | 0.0 | 1,367 | 0.0 |
| 967 | 20.0 | 1,070 | 28.3 | 1,172 | 12.0 | 1,274 | 21.8 | 1,321 | 0.0 | 1,368 | 0.0 |
| 968 | 21.1 | 1,071 | 28.0 | 1,173 | 15.3 | 1,275 | 22.2 | 1,322 | 0.0 | 1,369 | 0.0 |
| 969 | 22.0 | 1,072 | 27.5 | 1,174 | 18.6 | 1,276 | 23.0 | 1,323 | 0.0 | 1,370 | 0.0 |
| 970 | 23.0 | 1,073 | 27.0 | 1,175 | 21.1 | 1,277 | 23.6 | 1,324 | 0.0 | 1,371 | 0.0 |
| 971 | 24.5 | 1,074 | 27.0 | 1,176 | 23.0 | | | | | | |
| 972 | 26.3 | 1,075 | 26.3 | 1,177 | 23.5 | | | | | | |
| 973 | 27.5 | 1,076 | 24.5 | 1,178 | 23.0 | | | | | | |
| 974 | 28.1 | 1,077 | 22.5 | 1,179 | 22.5 | | | | | | |
| 975 | 28.4 | 1,078 | 21.5 | 1,180 | 20.0 | | | | | | |
| 976 | 28.5 | 1,079 | 20.6 | 1,181 | 16.7 | | | | | | |
| 977 | 28.5 | 1,080 | 18.0 | 1,182 | 13.4 | | | | | | |
| 978 | 28.5 | 1,081 | 15.0 | 1,183 | 10.1 | | | | | | |
| 979 | 27.7 | 1,082 | 12.3 | 1,184 | 6.8 | | | | | | |
| 980 | 27.5 | 1,083 | 11.1 | 1,185 | 3.5 | | | | | | |
| 981 | 27.2 | 1,084 | 10.6 | 1,186 | 0.2 | | | | | | |
| 982 | 26.8 | 1,085 | 10.0 | 1,187 | 0.0 | | | | | | |
| 983 | 26.5 | 1,086 | 9.5 | 1,188 | 0.0 | | | | | | |
| 984 | 26.0 | 1,087 | 9.1 | 1,189 | 0.0 | | | | | | |
| 985 | 25.7 | 1,088 | 8.7 | 1,190 | 0.0 | | | | | | |
| 986 | 25.2 | 1,089 | 8.6 | 1,191 | 0.0 | | | | | | |
| 987 | 24.0 | 1,090 | 8.8 | 1,192 | 0.0 | | | | | | |
| 988 | 22.0 | 1,091 | 9.0 | 1,193 | 0.0 | | | | | | |
| 989 | 21.5 | 1,092 | 8.7 | 1,194 | 0.0 | | | | | | |
| 990 | 21.5 | 1,093 | 8.6 | 1,195 | 0.0 | | | | | | |
| 991 | 21.8 | 1,094 | 8.0 | 1,196 | 0.0 | | | | | | |
| 992 | 22.5 | 1,095 | 7.0 | 1,197 | 0.2 | | | | | | |
| 993 | 23.0 | 1,096 | 5.0 | 1,198 | 1.5 | | | | | | |
| 994 | 22.8 | 1,097 | 4.2 | 1,199 | 3.5 | | | | | | |
| 995 | 22.8 | 1,098 | 2.6 | 1,200 | 6.5 | | | | | | |
| 996 | 23.0 | 1,099 | 1.0 | 1,201 | 9.8 | | | | | | |
| 997 | 22.7 | 1,100 | 0.0 | 1,202 | 12.0 | | | | | | |
| 998 | 22.7 | 1,101 | 0.1 | 1,203 | 12.9 | | | | | | |
| 999 | 22.7 | 1,102 | 0.6 | 1,204 | 13.0 | | | | | | |
| 1,000 | 23.5 | 1,103 | 1.6 | 1,205 | 12.6 | | | | | | |
| 1,001 | 24.0 | 1,104 | 3.6 | 1,206 | 12.3 | | | | | | |
| 1,002 | 24.6 | 1,105 | 6.9 | 1,207 | 13.1 | | | | | | |
| 1,003 | 24.8 | 1,106 | 10.0 | 1,208 | 13.1 | | | | | | |
| 1,004 | 25.1 | 1,107 | 12.8 | 1,209 | 14.0 | | | | | | |
| 1,005 | 25.5 | 1,108 | 14.0 | 1,210 | 15.5 | | | | | | |
| 1,006 | 25.6 | 1,109 | 14.5 | 1,211 | 17.0 | | | | | | |
| 1,007 | 25.5 | 1,110 | 16.0 | 1,212 | 18.6 | | | | | | |
| 1,008 | 25.0 | 1,111 | 18.1 | 1,213 | 19.7 | | | | | | |
| 1,009 | 24.1 | 1,112 | 20.0 | 1,214 | 21.0 | | | | | | |
| 1,010 | 23.7 | 1,113 | 21.0 | 1,215 | 21.5 | | | | | | |
| 1,011 | 23.2 | 1,114 | 21.2 | 1,216 | 21.6 | | | | | | |
| 1,012 | 22.9 | 1,115 | 21.3 | 1,217 | 21.8 | | | | | | |
| 1,013 | 22.5 | 1,116 | 21.4 | 1,218 | 21.5 | | | | | | |
| 1,014 | 23.0 | 1,117 | 21.7 | 1,219 | 21.2 | | | | | | |
| 1,015 | 21.6 | 1,118 | 22.5 | 1,220 | 21.5 | | | | | | |
| 1,016 | 20.5 | 1,119 | 23.0 | 1,221 | 21.8 | | | | | | |
| 1,017 | 17.5 | 1,120 | 23.8 | 1,222 | 22.0 | | | | | | |
| 1,018 | 14.2 | 1,121 | 24.5 | 1,223 | 21.9 | | | | | | |
| 1,019 | 10.9 | 1,122 | 25.0 | 1,224 | 21.7 | | | | | | |
| 1,020 | 7.6 | 1,123 | 24.9 | 1,225 | 21.5 | | | | | | |
| 1,021 | 4.3 | 1,124 | 24.5 | 1,226 | 21.5 | | | | | | |
| 1,022 | 1.0 | 1,125 | 25.0 | 1,227 | 21.4 | | | | | | |
| 1,023 | 0.0 | 1,126 | 25.4 | 1,228 | 20.1 | | | | | | |
| 1,024 | 0.0 | 1,127 | 25.8 | 1,229 | 19.5 | | | | | | |
| 1,025 | 0.0 | 1,128 | 26.0 | 1,230 | 19.2 | | | | | | |
| 1,026 | 0.0 | | | | | | | | | | |

EXAMPLE 2

Example 1 was repeated with similar results except that the gamma alumina was impregnated with about 7% rare earth oxides by the following procedure:

100 grams of alumina (W. R. Grace & Co.) were placed in a container and rotated to permit uniform impregnation with a 7% rare earth chloride solution containing by weight about 55.3% $La_2O_3$, 20.0% $Ce_2O_3$, 17.3% $Nd_2O_3$, 6.02% $Pr_2O_3$, and 1.33% $Sm_2O_3$. Sufficient solution (90 mls.) was added until the pores of the alumina were filled. The impregnated alumina was then removed from the container and allowed to dry at about 110° C. for 2 hours. The rare earth impregnated alumina was then heated at 1600° F. for 5 hours and allowed to cool to room temperature.

EXAMPLE 3

Example 1 was repeated except that the monoliths were reversed so that the exhaust gases were first passed over the platinum coated monolith. The results obtained showed that this arrangement was not as satisfactory as that of Example 1. The Federal Test Cycle gave CO and HC grams per mile numbers cf. 9.1 and 0.3 respectively.

EXAMPLE 4

A monolith identical to those used in Example 1 was coated with gamma alumina and 0.3 wt. percent palladium also as in Example 1 and then coated with 0.3 wt. percent platinum also as in Example 1. The thus prepared monolith contained both platinum and palladium. This monolith was then subjected to the 1972 Cold Start Procedure Federal Test Cycle. Unacceptable results were obtained.

EXAMPLE 5

A first automobile exhaust catalyst in particulate form containing 0.15% by weight palladium was prepared by impregnating 100 grams of alumina balls (W. R. Grace & Co.) with a solution of palladium tetramine nitrate (7.5 g. $Pd(NO_3)_2$ in 300 mls. of water). A second automobile exhaust catalyst in particulate form was prepared by impregnating 100 grams of alumina balls (W. R. Grace & Co.) with 300 mls. acid. The second catalyst contained 0.15% by weight Pt.

The two catalysts were then placed in series with the palladium catalyst in position to initially intercept the exhaust gases and placed in a muffler on a 1971 Chevelle which was run according to the 1972 Cold Start Procedure Federal Test Cycle as explained in Example 1 and tested for CO and HC conversion. Less than 4.7 g./mile CO and less than 0.4 g./mile HC were produced.

EXAMPLE 6

Example 1 was repeated except that the palladium monolith was removed from the system and replaced by a second platinum catalyst, i.e. only platinum catalysts were used. When run according to the 1972 Cold Start Procedure Federal Test Cycle, unsatsifactory results were obtained. This test cycle gave exhaust emissions of 0.38 g./mile HC and 11.3 g./mile CO.

EXAMPLE 7

Example 1 was repeated except that the platinum monolith was removed from the system and replaced by a second palladium catalyst, i.e. only palladium catalysts were used. When run according to the 1972 Cold Start Procedure Federal Test Cycle, unsatisfactory results were obtained. This test cycle gave exhaust emissions of 0.33 g./mile HC and 6.8 g./mile CO.

EXAMPLE 8

This example illustrates the importance of first removing CO from the exhaust emissions.

A first monolith commercially available from Corning Glass Co. and measuring 1½" by 4" was impregnated with palladium as in Example 1. The monolith contained 0.15 wt. percent Pd.

A second monolith 3" x 4" and commercially available from Corning Glass Co. was impregnated with a well-known HC oxidation catalytic composition, copper, chromium, and manganese oxides and palladium to give a monolith containing 4% CuO, 6% $MnO_2$, 4% $Cr_2O_3$, and 0.02% Pd. by immersing the monolith in a solution prepared by dissolving 28.9 g. $Cu(NO_3)_2 \cdot 3H_2O$, 18.8 g. $CrO_3$, 19.28 g. $Mn(NO_3)_2$ (50%) in 170 ml. of water. The monolith was then dried at 302° F. for 2 hours and then treated with 150 ml. of a palladium triamine nitrate solution (containing 0.046 g. Pd), dried at 302° F. for 2 hours, and calcined at 1400° F. for 3 hours.

The two monoliths were then placed in series with the Pd monolith in position to initially intercept the exhaust gases and placed in a muffler on a 1971 Chevelle and tested as in Example 1. The results were as follows:

|    | G./mile |
|----|---------|
| HC | 0.50    |
| CO | 8.0     |

When a monolith prepared identical to the HC monolith above was used alone to remove pollutants on the same test, the following results were obtained:

|    | G./mile |
|----|---------|
| HC | 0.70    |
| CO | 16.0    |

Clearly the use of a palladium catalyst to initially intercept the exhaust gases is a significant improvement in the control of automobile pollution control.

It is to be understood that for purposes of the specification and claims parts refers to parts by weight. It is to be further understood that for purposes of the specification and claims support material is intended to refer to a monolith, particulate support material as explained heretofore and to monoliths which have been coated with a particular support coating, e.g. alumina.

It is claimed:

1. In a method of converting the noxious components of exhaust gases to innocuous entities by contacting said gases with a catalyst active for oxidation of hydrocarbons and carbon monoxide to carbon dioxide and water selected from the group consisting essentially of oxides of copper, chromium, cobalt, nickel, and platinum and palladium and mixtures thereof. The improvement comprising contacting said gases with a catalyst consisting of palladium on a stabilized alumina support to convert a substantial portion of the carbon monoxide in the gases to carbon dioxide and thereby prevent poisoning and reduction in activity of said oxidation catalyst, prior to contacting said gases with said oxidation catalyst.

2. The process according to claim 1 wherein the palladium catalyst and the oxidation catalyst are distended on a monolithic support.

3. The process according to claim 1 wherein the palladium catalyst and the oxidation catalyst are distended on a nodular support.

4. The process according to claim 1 wherein the palladium is present as about 0.02 to 0.50 weight percent of the catalyst.

References Cited

UNITED STATES PATENTS

| 3,086,839 | 4/1963  | Bloch        | 23—2 E   |
| 2,664,340 | 12/1953 | Houdry       | 23—2 E   |
| 3,544,264 | 12/1970 | Hardison     | 23—2 E   |
| 3,565,830 | 2/1971  | Keith et al. | 23—2 E   |
| 3,295,918 | 1/1967  | Briggs       | 23—2 E   |
| 3,282,861 | 11/1966 | Innes        | 23—2 E X |

FOREIGN PATENTS

| 1,014,629 | 7/1964  | Great Britain | 23—2 E |
| 1,332,755 | 6/1962  | France        | 23—2 E |
| 971,994   | 10/1964 | Great Britain | 23—2 E |
| 972,683   | 10/1964 | Great Britain | 23—2 E |

GEORGE O. PETERS, Primary Examiner

U.S. Cl. X.R.

60—299; 23—288 F